(12) United States Patent
Stickel

(10) Patent No.: US 6,964,268 B2
(45) Date of Patent: Nov. 15, 2005

(54) FUEL TANK HAVING A VENTING SYSTEM

(75) Inventor: Martin Stickel, Muggensturm (DE)

(73) Assignee: TI Automotive Technology Center GmbH, Rastatt (DE)

( * ) Notice: Subject to any disclaimer, the term of this patent is extended or adjusted under 35 U.S.C. 154(b) by 174 days.

(21) Appl. No.: 10/379,102

(22) Filed: Mar. 4, 2003

(65) Prior Publication Data

US 2003/0173365 A1 Sep. 18, 2003

(30) Foreign Application Priority Data

Mar. 5, 2002 (DE) .......................... 102 09 491

(51) Int. Cl.[7] .............................................. F02M 37/04
(52) U.S. Cl. .................. 123/516; 123/519; 137/565.34
(58) Field of Search ................. 123/516, 518, 123/519, 520, 521, 514; 137/565.22, 587, 565.34

(56) References Cited

U.S. PATENT DOCUMENTS

| | | | | |
|---|---|---|---|---|
| 3,804,291 A | * | 4/1974 | Fricker ...................... 220/746 |
| 3,917,109 A | * | 11/1975 | MacDonald ................ 220/746 |
| 4,024,848 A | * | 5/1977 | Lee ............................ 123/516 |
| 4,829,968 A | * | 5/1989 | Onufer ....................... 123/518 |
| 4,852,761 A | * | 8/1989 | Turner et al. ............... 220/746 |
| 5,131,439 A | | 7/1992 | Bucci |
| 5,375,579 A | * | 12/1994 | Mukai ........................ 123/520 |
| 5,868,119 A | * | 2/1999 | Endo et al. ................. 123/516 |
| 5,915,363 A | * | 6/1999 | Iwata et al. ................. 123/497 |
| 6,000,426 A | | 12/1999 | Tuckey et al. |
| 6,182,693 B1 | * | 2/2001 | Stack et al. ............ 137/565.17 |
| 6,591,866 B2 | * | 7/2003 | Distelhoff et al. ...... 137/565.22 |
| 6,718,953 B1 | * | 4/2004 | Torgerud .................... 123/516 |

* cited by examiner

*Primary Examiner*—Carl S. Miller
(74) *Attorney, Agent, or Firm*—Reising, Ethington, Barnes, Kisselle, P.C.

(57) ABSTRACT

A venting system for a fuel tank has an inlet opening that is communicated with a liquid separator arranged between the inlet opening and a vapor canister that preferably has an activated carbon filter. The liquid separator is preferably arranged in the interior of the fuel tank. In a preferred embodiment of the invention, a plurality of vent lines are arranged in the interior of the tank with the inlet openings of the vent lines spaced apart from each other so that there is always at least one inlet opening not exposed to liquid fuel. A line between the liquid separator and the activated carbon filter communicates with the upper region of the liquid separator. These measures ensure that the fuel vapors which are to be vented can pass undisturbed through the liquid separator while any liquid fuel which enters the separator collects in its lower region.

20 Claims, 4 Drawing Sheets

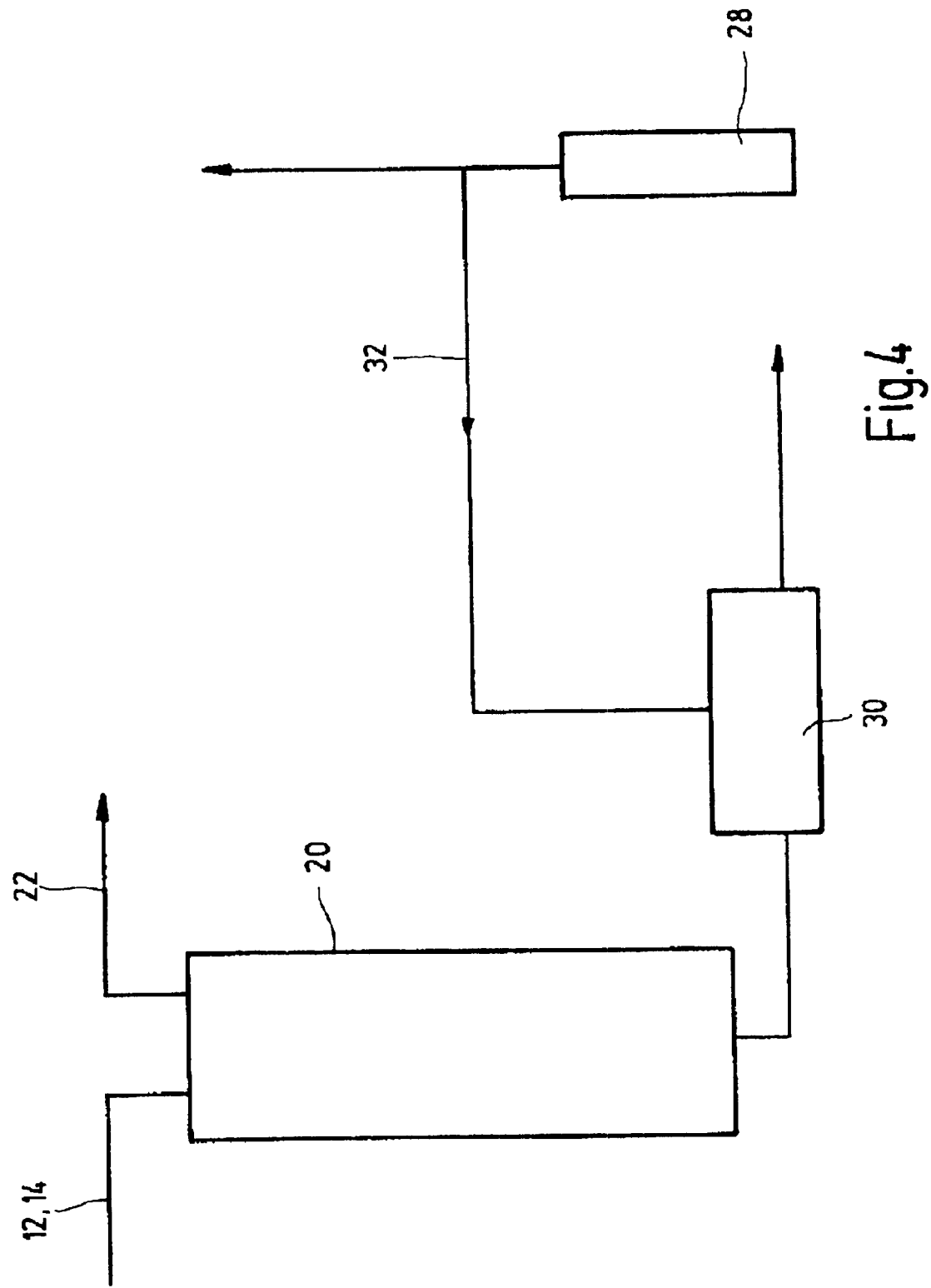

FUEL TANK HAVING A VENTING SYSTEM

Applicant claims the benefit of German Patent Application Serial No. DE 102 09 491.8 filed Mar. 5, 2002.

FIELD OF THE INVENTION

The invention relates to a fuel tank, and more particularly to a fuel tank having a venting system.

BACKGROUND OF THE INVENTION

In addition to the liquid fuel volume, fuel tanks also contain a gas volume, which is formed by fuel vapors and/or air. Temperature fluctuations lead to corresponding internal-pressure fluctuations in the tank. Excess pressures which occur have to be reduced, but emission regulations mean that fuel vapors must not escape into the atmosphere. The pressure is therefore reduced via an activated carbon filter (ACF) into which a vent line leads. However, it has to be ensured that liquid fuel does not pass into the activated carbon filter via the vent line. Up to now, a valve, for example a float valve, has therefore been arranged at the inlet opening of the vent line, the valve closing in the presence of liquid fuel, such as may occur if the vehicle is on a slope and/or during sloshing of the fuel. To ensure that the fuel tank can be vented during a wide range of circumstances which occur, two or more venting locations are provided with corresponding lines and valves, with the result that if one valve dips into liquid fuel, another valve, which is preferably arranged in the opposite region of the tank, may be open. These valves are subject to mechanical faults and cause additional costs during production of the fuel tank.

SUMMARY OF THE INVENTION

A venting system for a fuel tank has an inlet opening that is communicated with a liquid separator arranged between the inlet opening and a vapor canister that preferably has an activated carbon filter. The liquid separator is preferably arranged in the interior of the fuel tank. In a preferred embodiment of the invention, a plurality of vent lines are arranged in the interior of the tank with the inlet openings of the vent lines spaced apart from each other so that there is always at least one inlet opening not exposed to liquid fuel. The vent lines may each be connected individually to the liquid separator, but they preferably lead into a manifold or branch section which communicates with the liquid separator through a short connecting line. A line between the liquid separator and the activated carbon filter communicates with the upper region of the liquid separator. These measures ensure that the fuel vapors which are to be vented can pass undisturbed through the liquid separator while any liquid fuel which enters the separator collects in its lower region.

In a preferred embodiment of the invention, at least one vent line is arranged in the interior of the tank in such a manner that, during changes in inclination of the tank and/or fuel-sloshing movements which occur in the operation of a motor vehicle, at least a subregion of the line runs above the fuel level. This forms a siphon which prevents relatively large quantities of liquid from entering into the vent line.

The removal of liquid fuel from the separator preferably takes place via a line which is connected to the lower region of the liquid separator and is connected to a low-pressure source, which is preferably a jet pump arranged in the container and driven by a portion of the fuel discharged from a fuel pump arranged in the fuel tank.

In order to prevent liquid fuel from entering into the line leading from the separator to the activated carbon filter, the liquid separator preferably has a baffle plate arrangement arranged upstream of the line.

A preferably electromagnetically actuable shutoff valve can be arranged at an outlet of the activated carbon filter leading into the atmosphere, the shutoff valve can be switched in accordance with an electronic engine control system and/or a position sensor or filling-level sensor. The shutoff valve may be closed, for example for building up a counterpressure when filling the tank, so that the counterpressure causes the fuel nozzle to shut-off before the tank is overfilled, i.e. before the fuel level reaches the inlet openings of the vent lines, or to prevent fuel from running out in the event of the vehicle overturning.

BRIEF DESCRIPTION OF THE DRAWINGS

These and other objects, features and advantages of this invention will be apparent from the following detailed description of the preferred embodiments and best mode, appended claims and accompanying drawings in which:

FIG. 4 is a schematic view of some of the components of the fuel system.

DETAILED DESCRIPTION OF THE PREFERRED EMBODIMENT

Figure 1:
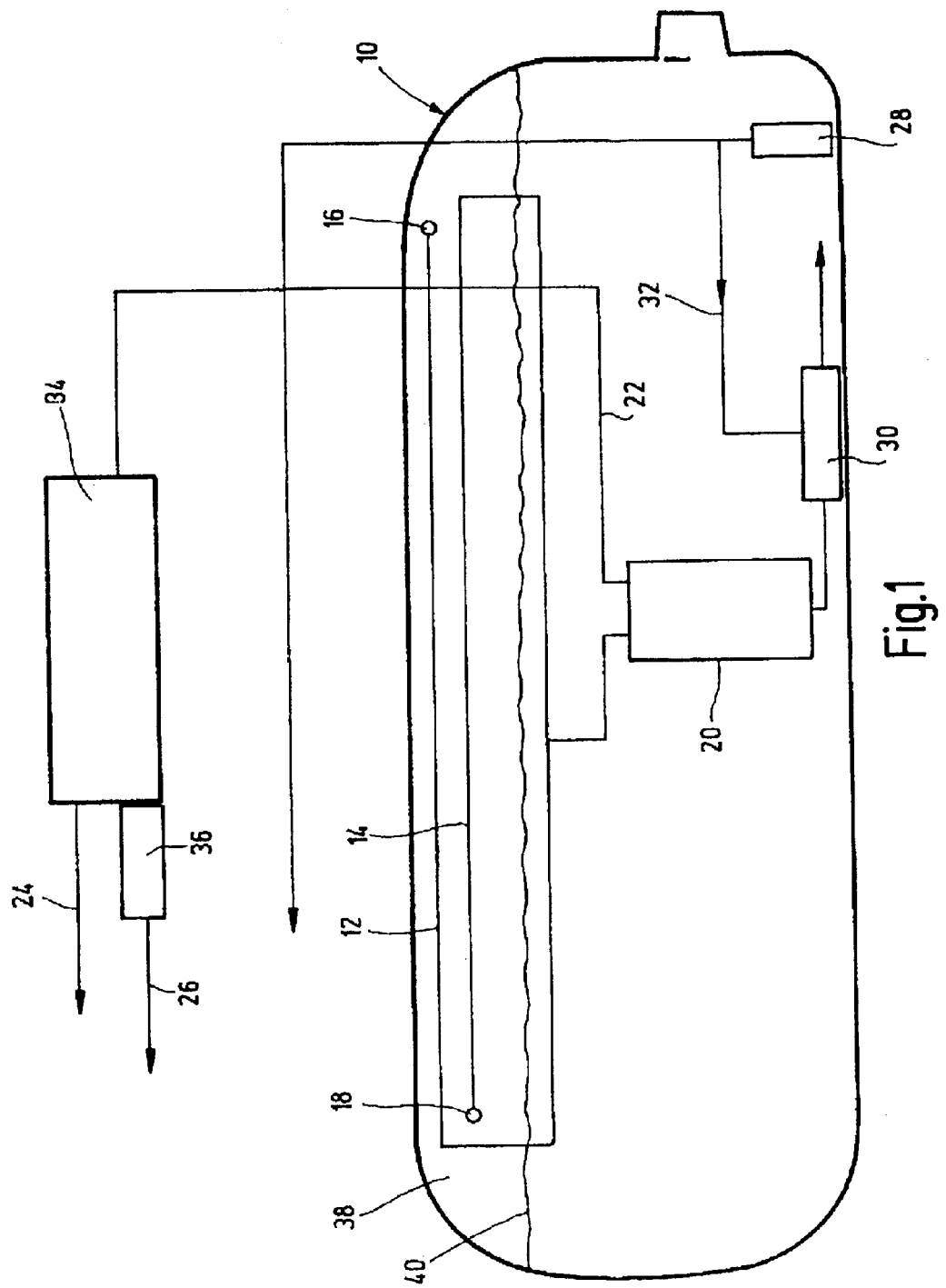
FIG. 1 shows a fuel system having a fuel tank with a venting system according to one presently preferred embodiment of the invention.

Referring in more detail to the drawings, FIGS. 1–4 illustrate a fuel system including a fuel tank 10 having an interior for a supply of fuel in which two vent lines 12, 14 having open inlet openings 16, 18 are arranged in the upper region of the tank interior. The vent lines 12, 14 have another end opposite the inlet openings 16, 18 leading a liquid separator 20. From there, a line 22 leads to a vapor canister 34 preferably providing an activated carbon filter (ACF) which is preferably arranged outside the tank and in which the vented fuel vapors can be collected and either added to the combustion air fed to an engine via a line 24 (cyclic regeneration in accordance with an electronic control system) or the cleaned air can be passed into the atmosphere via a line 26.

Also arranged in the tank are a fuel pump 28 and a jet pump 30. The latter has the following function: A portion of the fuel discharged from the fuel pump 28 (which may discharge fuel at a relatively high pressure, for example, without limitation, 4 bar) is routed to the jet pump 30 by line 32. This flow of fuel is the driving flow for the jet pump 30, and causes a low pressure to be produced in the area of the jet pump housing. The low pressure pumps liquid fuel from the tank 10 into a storage tank or container (not illustrated) and/or out of a second tank chamber when the tank is designed as a "saddle tank". A solenoid valve 36 can be arranged at the output of the vapor canister 34 leading into the atmosphere, the solenoid valve may have the function of providing an onboard diagnosis. If the solenoid valve is closed, pressure builds up in the tank. If the pressure which has built up and is measured by a pressure sensor is not within certain limits, this may indicate a malfunction of the valve 36 or possible leakages from the tank 10. Within the context of the invention, this valve 36 may carry out an additional function, which is explained in more detail below.

Figure 2:
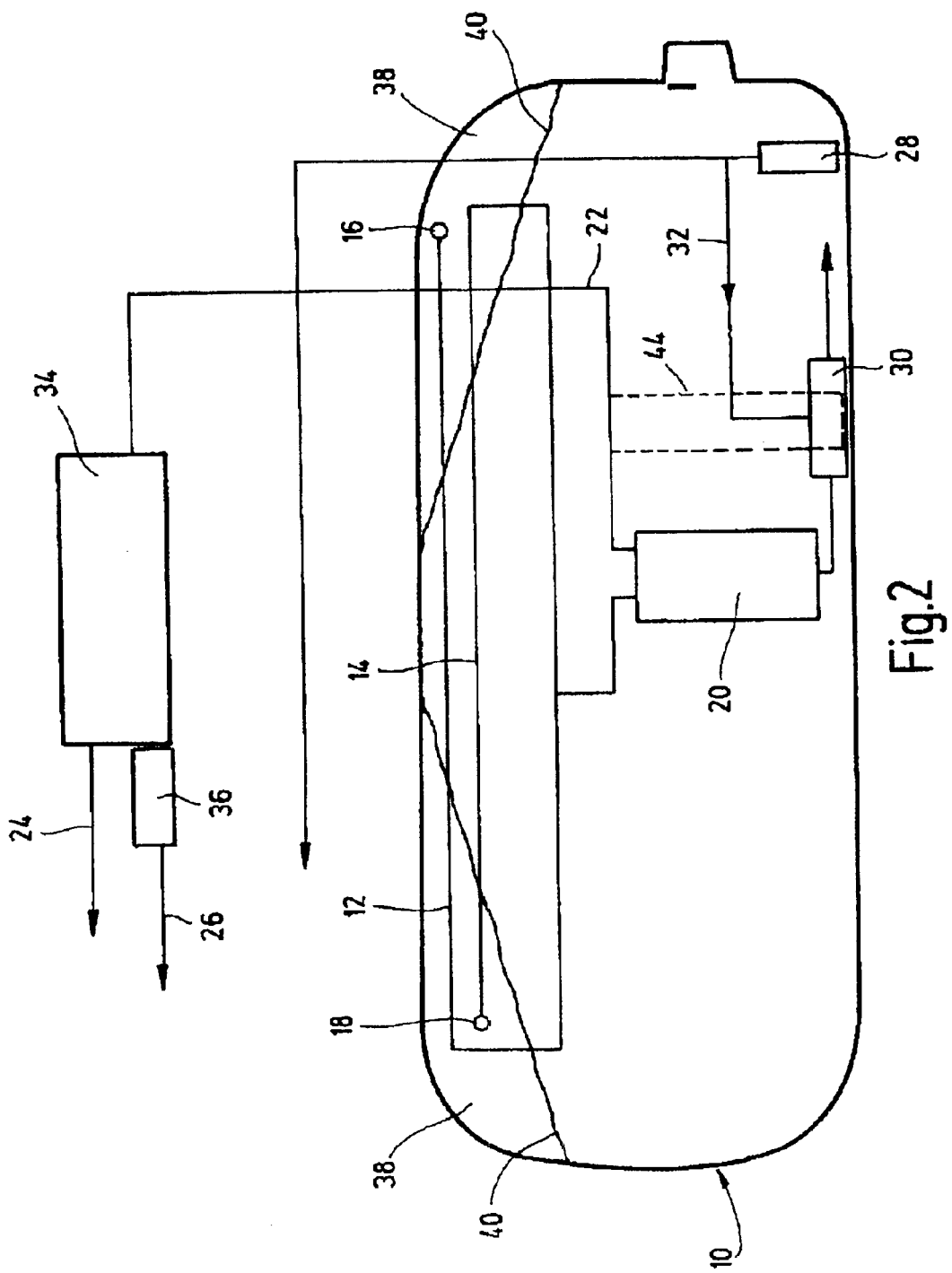
FIG. 2 shows the tank according to FIG. 1, with different fuel levels arising due to lateral inclination of the tank being indicated.
Figure 3:
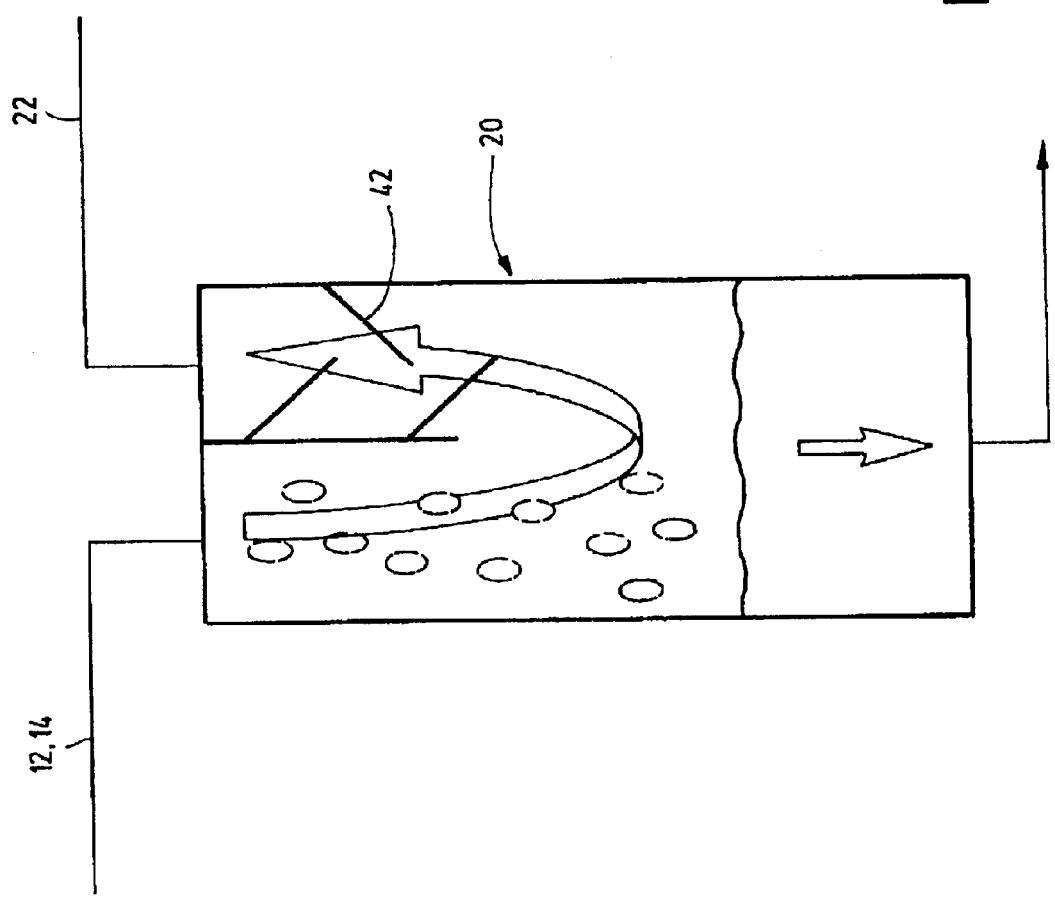
FIG. 3 shows an enlarged illustration of a liquid separator of the system of FIG. 1.

Even when the tank is fully filled, the open vent lines 12, 14 are open at least partially in the gas space 38 above the fuel level 40. During operation of the vehicle, however, static or dynamic operating states occur, in which, as illustrated in FIG. 2, one of the inlet openings 16, 18 is situated below the fuel level. The line routing ensures, however, that at least part of the line 12, 14 from this inlet opening to the liquid separator 20 lies above the liquid level 40 (formation of a siphon) in at least a wide range of and preferably substantially all orientations, attitudes, or inclinations of the fuel tank, with the result that a relatively large amount of fuel cannot flow through the respective line 12, 14 into the separator 20. In such a case, the venting function is ensured by the other vent line which has its inlet opening above the level of liquid fuel in the fuel tank.

If an excess pressure does not prevail in the tank and the inlet openings 16, 18 are normally situated above the liquid level, the vapor is sucked or drawn via the jet pump, which is arranged on the outlet side of the separating tank, and recycled into the tank. This corresponds to the situation as known from prior art, for example in the case of a saddle tank construction. Although fuel does not foam up to a great extent, it is nevertheless ensured that the fuel pump does not suck up any air.

Although liquid fuel can pass via the lines 12, 14 into the separator 20, it collects there in its lower region and is removed from there by the jet pump 30 while a gas space is formed above the liquid level in an upper region of the separator 20. An arrangement of baffle plates 42 (FIG. 3) is provided upstream of the vent line 22 and ensures that liquid cannot enter into the vent line 22 even during sloshing movements.

In the event of the vehicle overturning, an upside-down position of the fuel tank and other components may occur. In this case, even the baffle plate arrangement 42 cannot prevent liquid fuel from entering into the line 22 and the vapor canister 34. It then has to be ensured in another manner that liquid fuel does not pass to the outside. In order to prevent the liquid from escaping to the outside, the solenoid valve 36 at the outlet of the vapor canister is activated by a position sensor arranged on the vehicle.

As an alternative, relatively large quantities of fuel can also be prevented from running out by use of a suitable routing of the line 22 in the tank 10 by providing the line 22 with a siphon in the form of a loop 44 (shown in dashed line in FIG. 2) guided to the bottom of the tank.

The venting of the tank 10 as it is being filled can be realized in two ways. Firstly, a vent line (not illustrated) from or on the tank filler neck can protrude into the tank. As soon as the vent line is flooded by the rising liquid level, the fuel fill nozzle is shut off. Secondly, legal regulations may make it necessary to conduct the fuel vapors displaced during filling of the tank through the activated carbon filter. In this case, it can be ensured with the venting system according to the invention that the fuel level does not reach the open inlet openings 16, 18 of the vent lines 12, 14. In order to achieve this, a signal of a filling-level transmitter arranged in the tank 10 is used to establish when the desired level is reached. The signal tapped off from the filling-level transmitter is used for actuating the solenoid valve 36 at the outlet of the vapor canister filter 34. When the valve 36 is closed, a counterpressure builds up in the tank 10 resulting in the fuel nozzle being shut off and therefore ending the filling process.

What is claimed is:

1. A fuel system, comprising:
    a fuel tank having an interior in which a supply of fuel is maintained;
    at least one vent line having an inlet opening arranged in the interior of the tank generally in the upper region of the tank and having another end in the interior of the tank that is opposite to and spaced from the inlet opening; and
    a liquid separator that is spaced from said inlet opening, in communication with said another end of the vent line and adapted for communication with a vapor canister so that vapor that enters the inlet opening flows to the vapor canister through the liquid separator.

2. The fuel system of claim 1 wherein the liquid separator is arranged in the interior of the fuel tank.

3. The fuel system of claim 1 wherein a plurality of vent lines are arranged in the interior of the tank, each of the plurality of vent lines having an inlet opening with the inlet openings being spaced apart from each other.

4. The fuel system of claim 3 wherein the plurality of vent lines lead into a branch section which communicates with the liquid separator.

5. The fuel system of claim 1 wherein the at least one vent line communicates with an upper region of the liquid separator.

6. The fuel system of claim 4 wherein the branch section communicates with an upper region of the liquid separator.

7. The fuel system of claim 1 which also comprises a line that communicates with an upper region of the liquid separator and is adapted for communication with the vapor canister.

8. The fuel system of claim 1 wherein the at least one vent line is arranged in the interior of the tank in such a manner that at least a portion of the vent line is disposed above the level of fuel in the fuel tank in a wide range of orientations of the fuel tank.

9. The fuel system of claim 1 which also comprises a lower region of the liquid separator in which liquid may collect, and a line which communicates at one end with the lower region and at its other end with a low pressure source.

10. The fuel system of claim 9 wherein the low pressure source is a jet pump.

11. The fuel system of claim 10 wherein the jet pump is adapted to be driven by a portion of the output of fuel from a high pressure fuel pump.

12. The fuel system of claim 7 wherein the liquid separator has a baffle plate arranged upstream of the line that communicates with the upper region of the liquid separator and is adapted for communication with the vapor canister.

13. The fuel system of claim 1 which also comprises a vapor canister having an inlet in communication with the liquid separator and an outlet, and a shut-off valve arranged at the outlet of the vapor canister to control fluid flow from the vapor canister.

14. The fuel system of claim 3 wherein each of the plurality of vent lines is arranged in the interior of the tank in such a manner that at least a portion of each vent line is disposed above the level of fuel in the fuel tank in a wide range of orientations of the fuel tank.

15. The fuel tank of claim 1 wherein the inlet opening of said at least one vent line remains open to the interior of the fuel tank at all times.

16. The fuel tank of claim 13 wherein the vapor canister is disposed outside of the fuel tank.

17. The fuel assembly of claim 13 wherein the shutoff valve is electronically controlled and can be opened and closed in response to a signal provided to the valve.

18. A fuel system, comprising:

a fuel tank having an interior in which a supply of fuel is maintained;

at least two vent lines disposed within the fuel tank, each having an inlet opening arranged in the interior of the tank generally in the upper region of the tank and another end opposite to the inlet opening and arranged so that the inlet opening of at least one of the vent lines and a portion of another vent line between its inlet opening and its end opposite to its inlet opening are disposed above the level of fuel in the fuel tank in substantially all orientations of the fuel tank; and a liquid separator in communication with said another end of each vent line and adapted for communication with a vapor canister so that vapor that enters the inlet openings flows to the vapor canister through the liquid separator.

19. The fuel system of claim 18 wherein two vent lines are disposed in the fuel tank and each has a portion between its inlet opening and its end opposite to its inlet opening that is disposed adjacent to the inlet opening of the other vent line.

20. The fuel system of claim 18 wherein each of said inlet openings is open to the interior of the fuel tank at all times.

* * * * *